Jan. 19, 1932.  N. VON KORSCHENEWSKY  1,841,654
SHORT WAVE TRANSMISSION
Filed Sept. 24, 1926   3 Sheets-Sheet 2

INVENTOR
N. VON KORSCHENEWSKY
BY Ira J. Adams
ATTORNEY

Jan. 19, 1932.  N. VON KORSCHENEWSKY  1,841,654
SHORT WAVE TRANSMISSION
Filed Sept. 24, 1926   3 Sheets-Sheet 3

INVENTOR
N.VON KORSHENEWSKY
BY
ATTORNEY

Patented Jan. 19, 1932

1,841,654

UNITED STATES PATENT OFFICE

NICOLAI VON KORSCHENEWSKY, OF BERLIN, GERMANY, ASSIGNOR TO GESELLSCHAFT FUR DRAHTLOSE TELEGRAPHIE M. B. H., OF BERLIN, GERMANY, A CORPORATION OF GERMANY

SHORT WAVE TRANSMISSION

Application filed September 24, 1926, Serial No. 137,449, and in Germany October 1, 1925.

The present method is a novel method adapted to the transmission of electromagnetic waves, especially waves of very small length, for example, below 100 meters. The large range attainable in intelligence transmission on very short electromagnetic waves is explained by the fact that these waves, unlike long electromagnetic waves, do not travel along the surface of the earth from the transmission to the receiving station, but that they are propagated in higher atmospheric layers. The wave fronts reaching these higher atmospheric layers from the transmitter propagate in such layers and while suffering a number of refractions and reflections on their path, are finally refracted or reflected to the receiving point. Tests, as will be noted, have demonstrated that reception of these short waves is not feasible along their whole path between transmitter and receiving station, which proves that the electromagnetic field does not propagate along the surface of the earth. The dead or silent zones on which no reception is possible have been attempted to be explained on the theory of total reflection in dependence upon the optical conditions of the different atmospheric layers, their inclination, and the angle of incidence of the electromagnetic waves, with the result that within a certain region, no reception is possible since the waves sent out are not reflected any longer inside this angular space back to the ground, but reach out into space due to refraction. However, such hypothesis is not adequate to account for all the spatial fluctuations in the incoming energy volume and to explain the time variations.

The present invention starts from the idea and recognition that, to explain the phenomena surrounding the propagation of such short electromagnetic waves, the notions of geometrical optics alone are not sufficient, and that the state of polarization of the waves sent out is of essential importance. It will be remembered that the observation has been made that the state of polarization varies with the hour of the day, in other words, that it is dependent upon atmospheric conditions in so far as a turn of the plane of polarization of the oscillations takes place, so that re-orientation of the receiving antenna was necessary in order that reception may be possible at all. For instance, it is often found that a horizontal antenna is favorable for the reception of such short waves. However, the importance and influence of the state of polarization of the waves sent out is still far greater, as shall be shown at once. Transmitting antenna systems of the kind heretofore used were of such a nature that the electromagnetic energy at some distance from the transmitter propagated in the shape of plane waves linearly polarized in a certain direction. The influence of the direction of polarization of the waves emitted upon the incoming volume of energy substantially manifests itself in three different ways, to wit:

1. The amplitude or intensity of the reflected and refracted waves depends upon the angle of incidence and the optical constants, upon the mutual situation of the plane of polarization, and the plane of incidence of the waves, with the result that the intensity at the receiving station is a direct function of the plane of polarization of the waves sent out. This dependence is known from the electromagnetic theory of light, indeed the intensity conditions of the rays are determined by the Fresnel formulæ. It follows from them that the amplitude of a ray oscillating in the plane of incidence undergoes a diminution upon reflection. This reduction in amplitude or intensity may become so great that, in the presence of a certain angle of incidence between the direction of the wave and the refracting medium, no reflection at all is occasioned, but only a refraction. Hence, the case may arise where, due to unsatisfactory position of an atmospheric layer, no oscillation at all reaches the ground, although for a ray not linearly polarized, geometric conditions would make reflection entirely possible. If the layer in question where refraction or reflection takes place, constitutes a boundary or separation layer between two media possessing conductivity (marked ionization), the reflection and refraction will be attended by complex conditions. Still, also in this case the fact holds true that the component oscillating parallel to the plane of incidence is attenuated incidental to reflection, and that it attains a minimum value in the presence of a certain angle. Hence, in view of the frequent refractions and reflections suffered by the wave while propagating in the atmospheric layers, it will be seen that no matter what the direction of polarization of the oscillations sent out may be, attenuation and frequently complete destruction of the received energy must take place.

2. The interference action at the receiving point between the different rays reaching it depends likewise upon the direction of polarization, for the resultant field, as will be remembered, is composed of rays refracted and reflected in different layers with the incidental result that disappearance or diminution of the incoming energy is brought about, indeed, this is only possible by that all of the rays are polarized in one plane so that elimination is possible.

3. A change in receiving energy takes place in that the oscillation at the receiving station is so directed with reference to the antenna that no induction takes place, so that, to make reception possible, it would be necessary to re-adjust the position of the receiving antenna according to the rotation of the plane of polarization.

The three causes above enumerated leading to diminution and extinction of the incoming energy, as must be remembered, are associated with the fact that such waves as are emitted, are polarized in a certain direction. The object of the present invention is, therefore, to remove this inconvenience.

The basic idea underlying the present invention consists in that, for intelligence transmission by means of very short electromagnetic waves, a method must be followed in which the oscillations of the waves radiated from the transmitter will not be polarized constantly in one plane. In other words, preference of a definite direction of oscillation must be avoided. A solution of this problem consists in that the waves radiated by the transmitter are not linearly polarized, but rather elliptically or circularly polarized. It is well known that a circularly polarized oscillation can always be resolved into two oscillations being at right angles to each other, linearly polarized, of equal amplitude, and of a phase angle of ¼ wave-length, the direction in which such resolution takes place being arbitrary. This obviates any definite direction of the wave emitted being preferred.

An arrangement in which this idea and form of construction is incorporated, consists in that two antennæ are used which are placed at an angle of 90 degrees with reference to each other, and which are excited with a relative phase angle of 90 degrees, the excitation to be of equal amplitude. The field radiated by such an antenna arrangement is circularly polarized.

In the various figures of the drawings I have shown various forms which my invention may assume.

Figure 1:
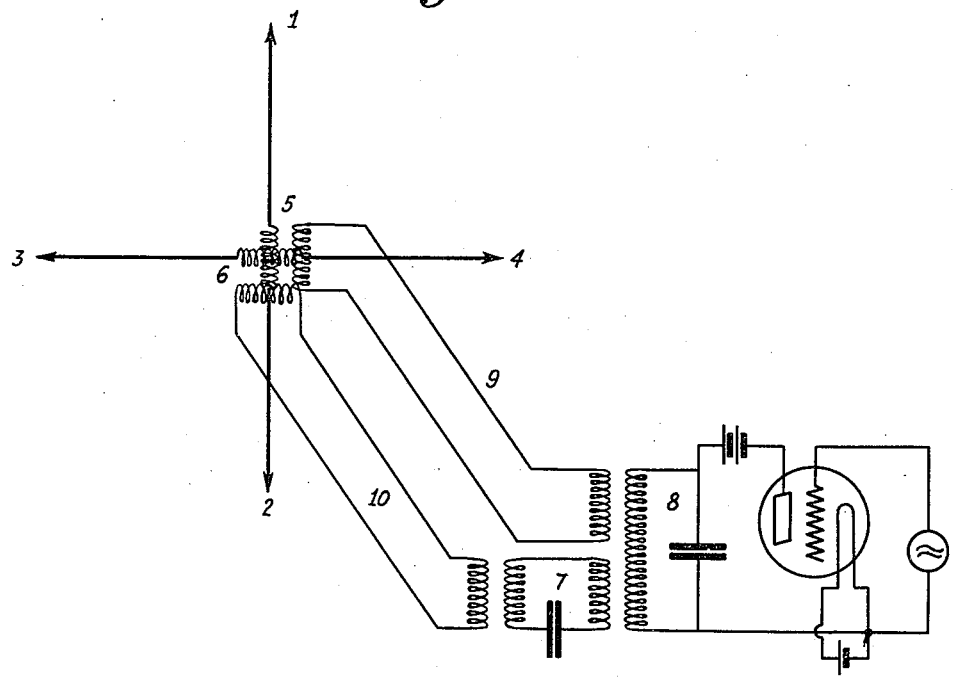
Fig. 1 shows a polarizing means with two antennæ arranged at 90° with respect to each other.

A form of construction of the above mentioned type is shown in Fig. 1 where 1, 2 is an antenna and 3, 4 a second antenna displaced 90 degrees with reference to the former; 5, 6 denote the coupling coils for energy supply; the exciter consists of a thermionic generator circuit 8, one antenna being fed by way of the lead 9, the other by way of lead 10, a tuned circuit 7 being inserted between the generator circuit and the transmission lead 10 to create a phase angle of 90°.

The necessary phase displacement, of course, could be produced also by other methods, by means of a phase shifter (advancer), or of a compensating circuit.

The principle underlying the invention as hereinbefore described offers the advantage over those heretofore disclosed that no definite direction is prefered in the wave sent out. Still, on the way from the transmitter to the receiver station, preference of a definite direction of polarization occurs since after the first refractions and reflections the component in one direction of oscillation must prevail, indeed, this direction is fixed after reflection or refraction has been produced, so that the form of construction and application of the invention compared with the customary methods (where the wave sent out has a fixed direction when sent out) represents a progress, while yet there is a chance for a weakening of the incoming energy due to further reflections and refractions being caused, such weakening or attenuation being occasioned upon the further propagation of the waves on account of the fact that a definite preferred direction of polarization is present. Also in this case, though with less probability than when transmitting on a linearly polarized wave, it may happen that complete extinction of the incoming energy takes place. In conformity with the invention, taken as an ideal case, the radiation of such waves is to be considered as are linearly polarized in the most differing planes so that an analogy with natural light rays is obtained, with the result that the probability of the incoming energy being completely wiped out or strongly attenuated is considerably diminished. The problem that had to be solved consisted in designing a transmission system which, though sending out linearly polarized waves, sends out waves whose polarization plane changes periodically in extremely rapid succession. A solution to this problem consists in that two antenna systems are used, one of which creates a dextro-circularly polarized field, the other one a sinistro-circularly polarized field, the oscillations in these two systems having to be so influenced that the phase difference of the two circularly polarized fields is altered at definite intervals; for in this case there arises a resultant field which is linearly polarized, but whose plane of polarization varies at the rhythm of the change in phase difference of the two circularly polarized fields. To further explain this idea, reference may be made here to the composition of two uniform motions taking place at like speed in opposite directions upon a circular path.

Figure 2:
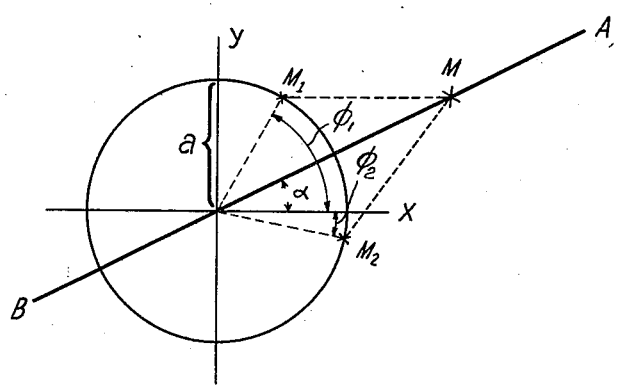
Fig. 2 is a graphical analysis of the wave motions on a circular path.

Referring to Fig. 2, point $M_1$ moves uniformly upon a circular line of radius $a$ in clockwise direction. Suppose the time of convolution is T. The second point $M_2$ shall be assumed to move at the same rate of speed on this circular line in the contrary direction. Then, as shown by a mathematical analysis, there results the composite or resultant oscillation of point M along the straight line A B which is inclined by an angle $\alpha$ with reference to the abscissa $x$. The amplitude of this oscillation equals $2a$ or double amplitude, whereas the angle of inclination $\alpha$ is equal to $\frac{1}{2}(\phi_2 - \phi_1)$, the bracket containing the difference of the two phase angles of the initial phases of the circular motions. The equation for the straight line along which the oscillations take place is thus given by $$y = x \tan \frac{\phi_2 - \phi_1}{2}.$$

As can be seen therefrom, the direction of motion or oscillation as given by the straight line A B can be varied, if it is possible to vary the phase angle difference $\phi_2 - \phi_1$. Such an arrangement can be created by utilizing two antenna systems each of which consists of two antennæ at right angles to each other, the phase displacement angle between the currents of like amplitude in the two antennæ of one system amounting to 90 degrees, and in the other one 270 degrees. This would result in a linearly polarized field. If, then, by some means or another, the energy supply to one or both antennæ of one of said systems is periodically interrupted, in such a manner that after each interruption an additional phase displacement is occasioned, it will be seen that such an antenna system radiates off a wave which is linearly polarized; however, the polarization plane changes continuously in conformity with the number of breaks. Such an interruption of the oscillations can be effected by interrupting the energy supplied to one of the systems by a periodical oscillation, of a period $t$ compared with period T of the high frequency wave sent out, or, in other words, of the convolution period of the circularly polarized oscillation is expressed by the formula $$t = \left(\frac{n+l}{m}\right)T,$$

where $n$ and $m$ are whole numbers, $m$ being greater than $l$. It will be seen that the higher $m$ is chosen, the greater will be the change in the polarization plane, so that the wave sent out may correspond practically to an unpolarized wave. The relation between the period of the emitted wave and the period of interruptions as above indicated is a theoretical condition which must be fulfilled in order that the resultant effect may be attained. In practice, conditions are so that the dependence of the frequency or period of breaks or interruptions, upon the high frequency need not be satisfied with absolute exactness, since two high frequency waves of such high frequency as required for the present problem can never be made to oscillate in synchronism, with the result that in each interruption variations in the initial phase of the oscillations of both systems will occur irregularly though quite dependably, and that constant changes in the plane of polarization of the oscillations must happen. For the sake of argument we will assume that the radio frequency is $10^7$ corresponding to a 30-meter wave; in this case the frequency of interruptions to be used may be about $10^4$, $n$ being then = 1000. If $m$ is chosen = 100, the theoretical relation shows that 100 different directions of polarization are consecutively passed through.

Figure 3:
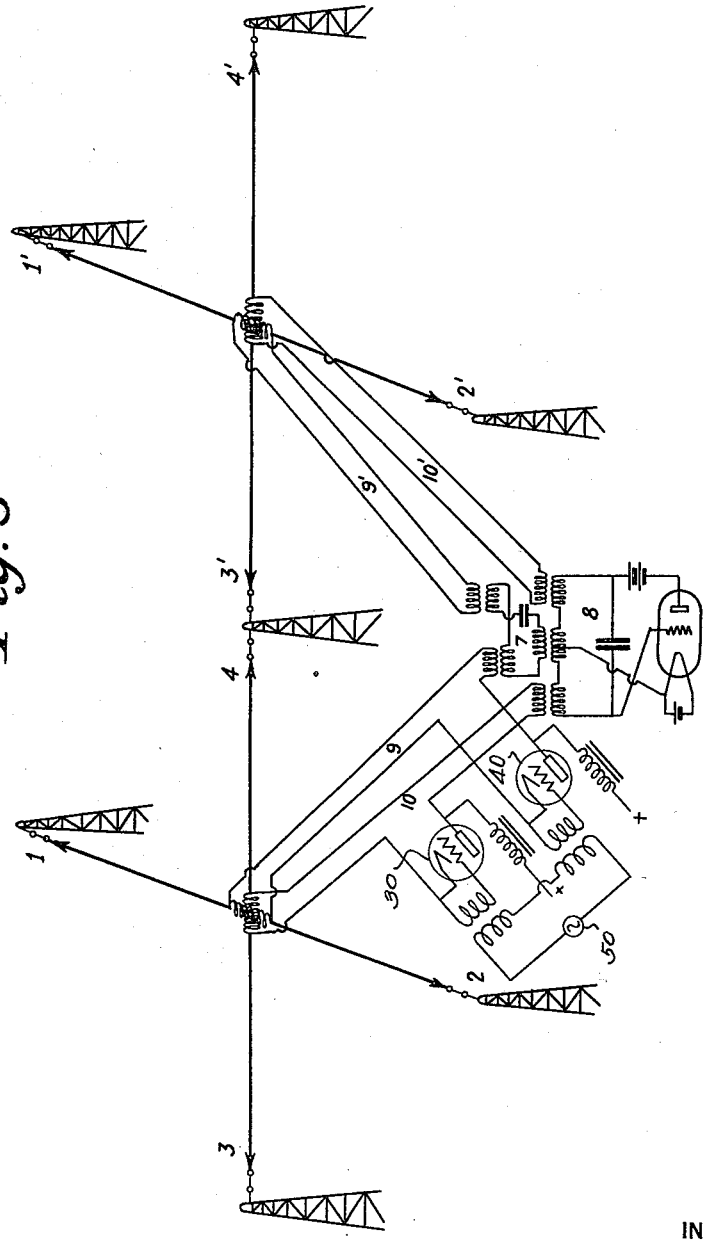
Fig. 3 is a modification of Fig. 1 showing a second antenna structure adapted to produce a second polarized wave and spaced apart from the first antenna structure.

One form of construction of this idea is illustrated in Fig. 3. The antenna arrangement comprises two pairs of antennæ, the component parts of which are crossing each other at right angles. 1, 2, and 3, 4, form one antenna system, and 1', 2', and 3', 4', form the second antenna system. The generator consists of a transmitter tube circuit 8 the generator circuit being coupled with the tuned circuit 7. Energy supply to the different antennæ takes place by way of the antenna feed leads 10, 9, 10' and 9', leads 10 and 10' being connected directly with the working circuit of the generator, and being adapted to produce co-phasal excitation of the antennæ 3, 4 and 3', 4', whereas the lead 9 is coupled with the generator by way of tuning circuit 7 thereby causing excitation of antenna 1, 2, being shifted in phase by an angle of 90 degrees. The supply lead 9' is also united with the tuned circuit, but in opposite sense as lead 9, so that the phase displacement of the antennæ 1, 2, has a sign opposed to that of the antennæ 1', 2', with the end in view that one antenna system may radiate a dextro-circularly polarized field, and the other one a sinistro-circularly polarized field. The interrupter device intended to interrupt the energy supply to one of the systems, is shown in the drawings. The interruption can be accomplished by that in the respective pairs of the leads, for instance, 9, 10, electron tubes 30, 40 is inserted, and by supplying the grids of these tubes with alternating current potentials of the frequency of interruptions from source 50.

Figure 4:
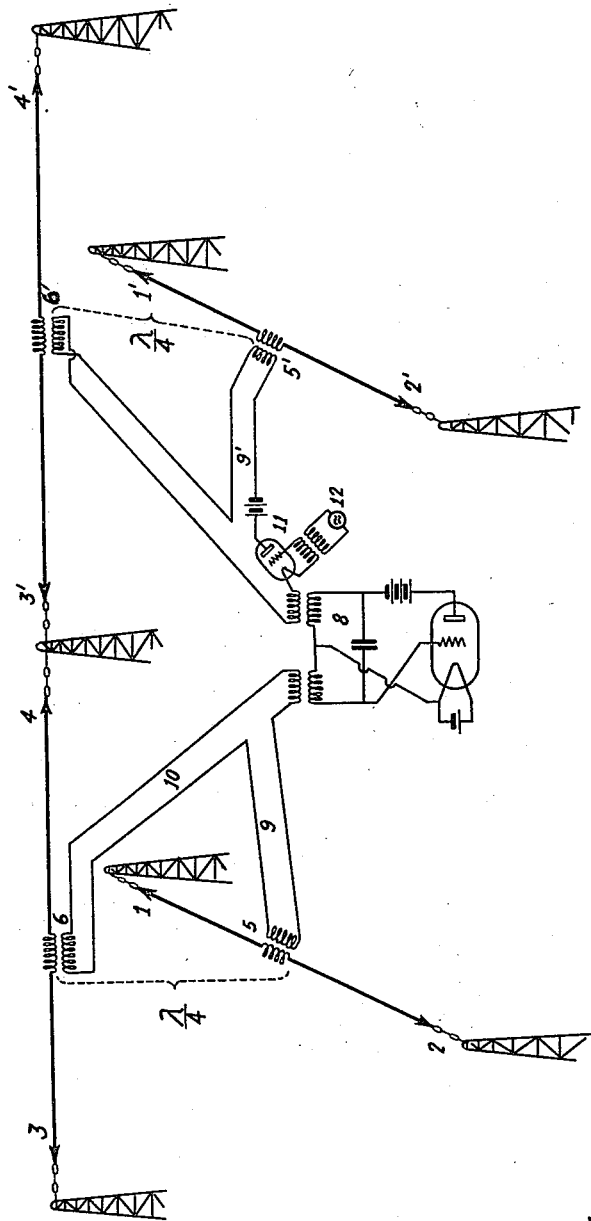
Fig. 4 is a further modification of Figs. 1 and 3 with each of the separate members of the complete antenna structure spaced apart from each other by approximately a quarter wave length.

In order to radiate off circularly polarized fields, it is, however, not necessary that the antennæ be excited by phase-displaced currents. Indeed, they may also be excited by currents co-phasal with reference to one another; but in this case they must be erected at conveniently great distance from one another in order that the required phase angle for the resultant radiated field may be produced. Such an arrangement is shown in Fig. 4. As here shown, the distance between antennæ 1, 2, and 3, 4, on the one hand, and 1', 2', and 3', 4', on the other hand is ¼ wave. The different antennæ are excited from generator 8 by way of the transfer leads 9 and 10 and 9' and 10'. Lead 9 is united with the antennæ 1, 2, through the intermediary of coil 5, and lead 9' through coil 5' in the same sense with antennæ 1', 2'. The connection between the antennæ 3, 4, and the transfer or supply lead is established by way of coil 6, and the coupling of antennæ 3', 4', is effected in opposite sense by the agency of coil 6'. In the joint portion of the supply leads 10', 9', is inserted an electron tube 11 with battery, whose grid is supplied with the interruption potential from a high frequency source. This arrangement has this advantage over the one before described that no phase displacement is required by additional tuning circuits, a feature that would render a plant working with very short waves rather complicated. The arrangements shown in the drawings where straight oscillators are suspended between towers, of course, represent only a few forms of construction of the invention by way of example. For instance, also crossed loop antennæ could be used. It may be remarked also that the mode of excitation, and the orientation of the different antennæ has not been specially pointed out, it being understood that in this connection methods may be resorted to as are known from the state of the art. For instance, excitation of the antennæ could also be effected at the end of the different antennæ in well-known manner, while with regard to orientation it may be stated that any desired angle of inclination may be chosen in order that radiations may be guided in a certain direction. As a general rule, it may be a convenient plan to stretch out the antennæ 3, 4, and 3', 4' horizontally as shown in the drawings, while antennæ 1, 2, and 1', 2' may be inclined a certain angle with reference to the horizontal. Another good plan is to choose the suspension of the antennæ in such a way that the inclination of the antennæ can be varied.

Having described my invention, I claim:

1. A method for the transmission of intelligence on electro-magnetic waves which includes creating a dextro-circularly polarized field, creating a sinistro-circularly polarized field, and varying the relative phase of the polarized fields at definite intervals.

2. Means for transmitting intelligence by electro-magnetic waves comprising a plurality of antenna systems each of which consists of two antennæ at right angles to each other, means for displacing the phase angle between currents of like amplitude in two antennæ of the systems by approximately 90 degrees in one and in the other by approximately 270 degrees and means for periodically interrupting the energy supplied to one of said antenna systems.

3. An electro-magnetic wave transmitting system comprising two pairs of antennæ, the component parts of each being at right angles to each other, a high frequency generator coupled to each of said component parts, means for shifting the phase in certain of said component parts, the corresponding component parts of each pair of antennæ being arranged so that the phase displacement of one has a sign opposed to that of the other and an energy interrupter device in one of said systems, whereby one antenna system radiates a dextro-circularly polarized field and the other a sinistro-polarized field.

4. An electro-magnetic wave transmitting system comprising two pairs of antennæ the component parts of each being at right angles to each other the distance between said component parts being ¼ of the transmitting wave length, a high frequency generator for exciting said different antennæ comprising coupling circuits for one corresponding component part of each of said antennæ and means for effecting coupling in the opposite sense in the other corresponding part of each antenna and means for periodically interrupting the energy supply to one of said antennæ.

5. An electro-magnetic wave transmitting device comprising an antenna system for radiating a dextro-circularly polarized field and a second antenna system for radiating a sinistro-circularly polarized field of like frequency, means for influencing said fields whereby the phase difference of the two circularly polarized fields changes at certain intervals, so that the resultant field of the wave emitted is linearly polarized, while the plane of polarization changes periodically.

6. In combination, in a system for eliminating fading, a plurality of radiators, means for exciting the radiators to produce a resultant linear polarized field, and means for varying the excitation of only some of the radiators so that the plane of the resultant field is altered in a desired fashion.

7. The method of eliminating the effects of fading which includes, simultaneously generating separate rotating undulating electromagnetic fields, combining the fields to produce a resultant field, and varying the generated fields relative to each other so that the plane of the resultant field changes rapidly between desired limits.

8. The method of eliminating the effects of fading which includes producing a plurality of rotating fields, combining the fields to produce a linear field, and varying one of the produced fields so that the plane of the linear field is oscillated in a predetermined manner.

9. In combination, a group of radiators, means for exciting the radiators to produce a rotating field in one direction, another group of radiators, means for exciting the last mentioned group of radiators to produce a rotating field in another direction, whereby when the rotating fields are combined a resultant linear field is produced, and means for varying the relative excitation of the groups of radiators so as to cause the resultant field to oscillate in direction.

10. In a system for transmitting intelligence from one geographically situated point to another geographically situated point by propagated electromagnetic waves derived from the flow of high frequency undulatory electrical currents acted upon in accordance with the intelligence to be transmitted, the method of propagating high frequency energy which includes both wobbling the direction and varying the plane of polarization of the emitted energy.

11. In a system for transmitting intelligence from one geographically situated point to another geographically situated point by propagated electromagnetic waves derived from the flow of high frequency undulatory electrical currents acted upon in accordance with the intelligence to be transmitted, the method of propagating high frequency energy which includes rotating the plane of polarization of the emitted wave and wobbling the direction of the emitted wave at a frequency substantially lower than the oscillation frequency.

12. In a system for transmitting intelligence from one geographically situated point to another geographically situated point by propagated electro-magnetic waves derived from the flow of high frequency undulatory electrical currents acted upon in accordance with the intelligence to be transmitted, the method of reducing fading which includes radiating, at spaced points, waves, and separately varying the polarization of the radiated waves.

13. In a system for transmitting intelligence from one geographically situated point to another geographically situated point by propagated electro-magnetic waves derived from the flow of high frequency undulatory electrical currents acted upon in accordance with the intelligence to be transmitted, the method of reducing fading which includes radiating, at spaced points, waves, and separately varying the polarization of one wave relative to another.

14. In a system for transmitting intelligence from one geographically situated point to another geographically situated point by propagated electro-magnetic waves derived from the flow of high frequency undulatory electrical currents acted upon in accordance with the intelligence to be transmitted, the method of reducing fading which includes radiating, at separated points, rotating waves, and wobbling the directivity of the resultant wave.

15. In a system for transmitting intelligence from one geographically situated point to another geographically situated point by propagated electro-magnetic waves derived from the flow of high frequency undulatory electrical currents acted upon in accordance with the intelligence to be transmitted, the method of reducing fading which includes, radiating, at separated points, waves, varying the polarization of one of the waves cyclically, and wobbling the directivity of the resultant wave.

NICOLAI von KORSCHENEWSKY.